US011320163B2

(12) United States Patent
Betschart et al.

(10) Patent No.: US 11,320,163 B2
(45) Date of Patent: May 3, 2022

(54) ACTUATOR WITH A USB INTERFACE

(71) Applicant: Siemens Schweiz AG, Zürich (CH)

(72) Inventors: Adrian Betschart, Cham (CH); Sacha Soltermann, Steinhausen (CH)

(73) Assignee: SIEMENS SCHWEIZ AG, Zurich (CH)

( * ) Notice: Subject to any disclaimer, the term of this patent is extended or adjusted under 35 U.S.C. 154(b) by 190 days.

(21) Appl. No.: 16/465,409

(22) PCT Filed: Nov. 15, 2017

(86) PCT No.: PCT/EP2017/079264
§ 371 (c)(1),
(2) Date: May 30, 2019

(87) PCT Pub. No.: WO2018/108420
PCT Pub. Date: Jun. 21, 2018

(65) Prior Publication Data
US 2019/0368760 A1    Dec. 5, 2019

(30) Foreign Application Priority Data
Dec. 13, 2016  (DE) ...................... 10 2016 224 861.8

(51) Int. Cl.
*F24F 11/32*   (2018.01)
*F24F 11/65*   (2018.01)
(Continued)

(52) U.S. Cl.
CPC .............. *F24F 11/32* (2018.01); *F24F 11/65* (2018.01); *G05B 19/042* (2013.01);
(Continued)

(58) Field of Classification Search
CPC ........ F24F 11/32; F24F 11/65; H04L 12/2807
See application file for complete search history.

(56) References Cited

U.S. PATENT DOCUMENTS 5,340,767 A * 8/1994 Flaherty ................. H01L 24/06
257/E23.02
6,125,448 A   9/2000 Schwan et al. .............. 713/300
(Continued)

FOREIGN PATENT DOCUMENTS

CN   105408833 A    3/2016   ............. G06F 1/26
DE   103 20 698 A1  12/2004  ............ G05B 15/00
(Continued)

OTHER PUBLICATIONS

International Search Report and Written Opinion, Application No. PCT/EP2017/079264, 20 pages, dated Jan. 31, 2018.

*Primary Examiner* — Vincent H Tran
(74) *Attorney, Agent, or Firm* — Slayden Grubert Beard PLLC

(57) ABSTRACT

Various embodiments include an actuator comprising: a power supply connection; a processor for controlling and monitoring the actuator; a peripheral unit with power consumers; and a connection socket connected to a serial interface of the processor. The processor receives primary configuration data from an operating device connected to the connection socket and/or sends secondary configuration data and/or diagnostic data to the operating device. A respective current fed in externally feeds exclusively into a common connection. There is a voltage regulator for supplying power to the processor and a switch configured to be activated by the processor for supplying power to the peripheral unit, both connected downstream of the common connection. The processor activates the switch to close only if the voltage detected at a feed-in point of the power supply connection exceeds a first limit or if the voltage detected at the common connection exceeds a second limit.

9 Claims, 1 Drawing Sheet

(51) Int. Cl.
　　*G05B 19/042* 　　(2006.01)
　　*H04L 12/28* 　　(2006.01)
　　*F24F 140/60* 　　(2018.01)
　　*F24F 140/50* 　　(2018.01)

(52) U.S. Cl.
　　CPC ...... *H04L 12/2807* (2013.01); *F24F 2140/50* (2018.01); *F24F 2140/60* (2018.01); *G05B 2219/2614* (2013.01)

(56) References Cited

U.S. PATENT DOCUMENTS

| | | | |
|---|---|---|---|
| 7,293,187 B2 * | 11/2007 | Ono | H04N 1/00901 |
| | | | 713/324 |
| 9,711,038 B1 * | 7/2017 | Pennebaker, III | G01F 23/0076 |
| 9,939,773 B2 * | 4/2018 | Hanayama | B41J 29/38 |
| 9,979,190 B2 | 5/2018 | Patel | |
| 10,007,633 B2 | 6/2018 | Kroner et al. | |
| 10,431,985 B2 | 10/2019 | Goasguen | |
| 2004/0220685 A1 | 11/2004 | Heinemann | 700/79 |
| 2010/0246857 A1 * | 9/2010 | Kajita | H03G 3/3042 |
| | | | 381/120 |
| 2010/0257380 A1 * | 10/2010 | Huang | G06F 1/266 |
| | | | 713/300 |
| 2013/0006435 A1 | 1/2013 | Berrios et al. | 700/295 |
| 2013/0313904 A1 | 11/2013 | Kayama | 307/26 |
| 2014/0211351 A1 * | 7/2014 | Shoykhet | G06F 13/38 |
| | | | 361/86 |
| 2015/0179054 A1 * | 6/2015 | Castillo | G08C 17/02 |
| | | | 340/12.5 |
| 2015/0188609 A1 * | 7/2015 | Inoue | H04W 4/80 |
| | | | 455/41.1 |
| 2015/0346794 A1 * | 12/2015 | Sakashita | G06F 1/3287 |
| | | | 713/310 |
| 2016/0124480 A1 | 5/2016 | Raithel | 713/310 |
| 2016/0336741 A1 * | 11/2016 | Chen | H02J 7/0029 |
| 2017/0364022 A1 * | 12/2017 | Hanayama | B41J 29/13 |

FOREIGN PATENT DOCUMENTS

| | | | | |
|---|---|---|---|---|
| DE | 10 2013 106 572 A1 | 12/2014 | | H04L 12/40 |
| DE | 10 2014 016 056 A1 | 5/2016 | | G08C 19/00 |
| WO | 2016/087781 A1 | 6/2016 | | H02J 3/32 |
| WO | 2018/108420 A1 | 6/2018 | | G06F 1/26 |

* cited by examiner

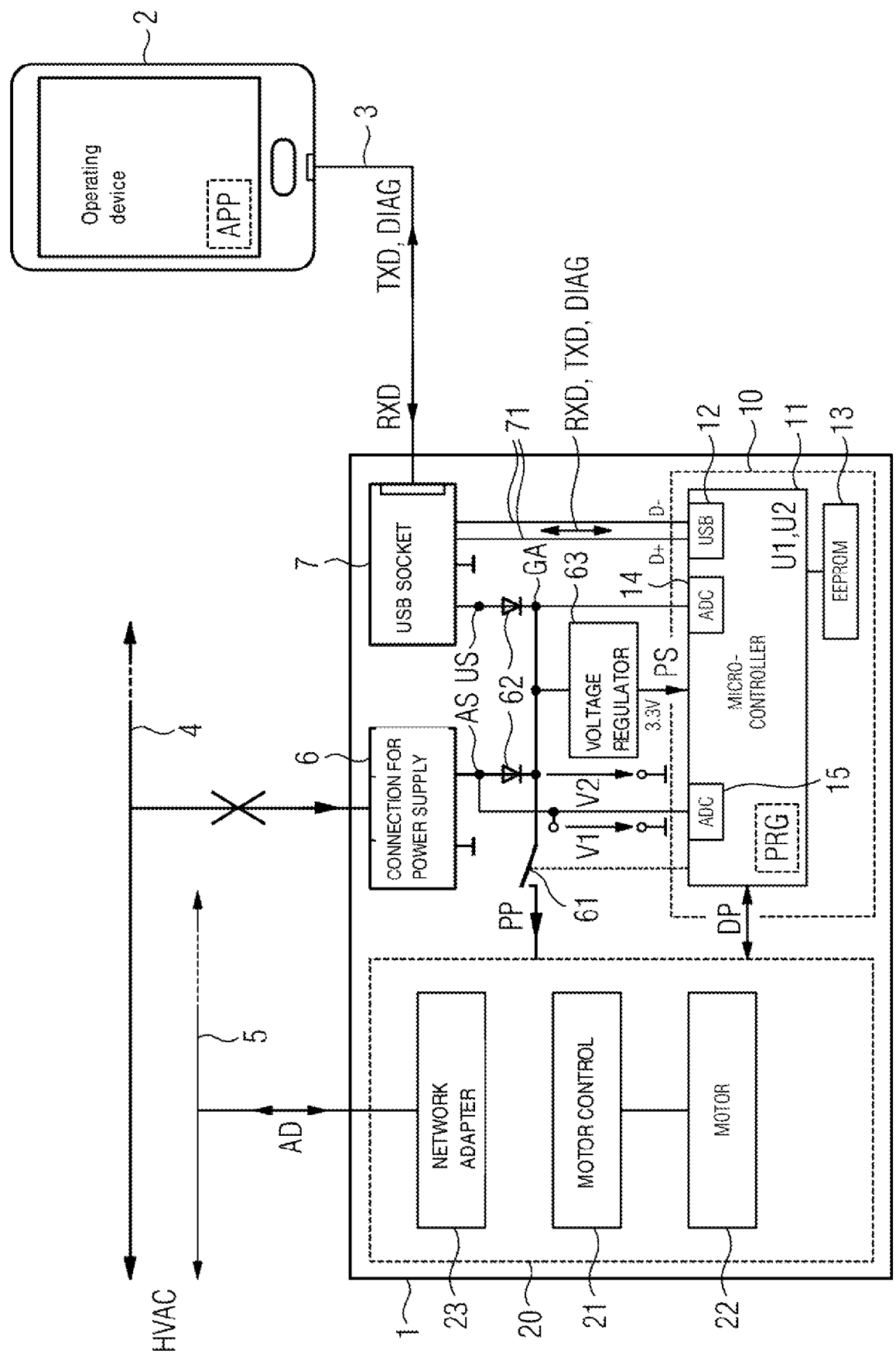

ACTUATOR WITH A USB INTERFACE

CROSS-REFERENCE TO RELATED APPLICATIONS

This application is a U.S. National Stage Application of International Application No. PCT/EP2017/079264 filed Nov. 15, 2017, which designates the United States of America, and claims priority to DE Application No. 10 2016 224 861.8 filed Dec. 13, 2016, the contents of which are hereby incorporated by reference in their entirety.

TECHNICAL FIELD

The present disclosure relates to actuators. Various embodiments may be used for an HVAC installation (for Heating, Ventilation, and Air Conditioning).

BACKGROUND

The German published application DE 10 2013 106 572 A1 describes a field bus coupler, which additionally has a service connection for diagnostic data, via which it is connected to a service computer. The service connection can be realized according to the USB standard, for example. Furthermore, the field bus coupler transfers data exchanged via the field bus on to a serial sub bus by way of which I/O modules are coupled to the field bus coupler. Apart from the sub bus, which is only used to transmit data, a further bus can be present for supplying power to the I/O modules and/or the field bus coupler.

The published US application 2013/0313904 A1 discloses an integrated circuit which is provided for selecting between different sources of electric current depending on measured voltage levels, one current source being selected as a priority if both current sources are available.

The U.S. Pat. No. 6,125,448 A discloses a power supply for a device which is fed either from the network bus or from a local power supply. The power supply connection can be a connecting cable for example, which is led out of an actuator casing. The cable end can then be attached to a connecting terminal in a terminal box for example. Alternatively, a power supply socket can be arranged on the actuator casing, into which a connecting cable with a matching plug can be inserted. Then in turn the other end of the cable can be attached to a connecting terminal. The control unit typically comprises a processor-supported microcontroller. The said microcontroller is set up or programmed respectively to execute a computer program which is stored in the microcontroller or can be loaded into the microcontroller.

The heavy power consumers of an actuator are principally the motor control unit and the downstream electric motor, which typically moves a load applied to an actuation connection of the actuator via a reduction gear. The load can be a valve or a flap for setting a liquid or air flow for example. The actuation connection can be a rotary actuation connection, to perform a rotary actuating movement in an angular range from 0° to 90° for example. It can also be a linear actuation connection.

Usually the peripheral unit also has a communications interface for exchanging drive data with a higher-level control device. The drive data can comprise bus addresses, target positioning values or actual positioning values for example. Thus, for example the higher-level control device can output a target positioning value to an actuator with an assigned bus address, the actuator following the target positioning value, and then executing the corresponding positioning movement, and where relevant acknowledging it. The peripheral unit can consequently also be designated as a power section of the actuator which, in contrast to the control section or the "control electronics" of the actuator, needs an electrical output that is many times higher.

Transmission of the aforesaid data can be automatic, such as via a suitable serial interface cable after connection of the actuator to the operating device for example. It can also be effected, or enabled respectively, only after a user-side input on the operating device.

Typically, actuators are configured according to customer requirements or the envisioned field of application for the actuator only after production. To this end corresponding configuration data is transmitted from an operating device to the actuator. This type of configuration data is for example parameters such as the direction of rotation, the maximum rotational speed, the maximum torque, a device or bus address, or an actuator serial number. The diagnostic data can comprise on-times, power consumption, or maintenance times for the actuator, or logged errors.

Before an actuator can be configured, by using a—typically mobile—operating device via a—mostly proprietary—data interface, the actuator additionally needs to be supplied with electric current, apart from connecting the operating device. The actuator is usually supplied with current via the power supply connection of the actuator, such as for example by using an ac power pack or a battery unit. The background to having a separate power supply is that the power consumption of an actuator is much too large for it to be capable of being provided by a mobile operating device (handheld device), such as for example smart phone or tablet computer. This is particularly the case for HVAC actuators which have a power consumption of typically several Watts. On top of this, switching on the actuator or hooking up the actuator to the external power supply results in high start-up current peaks, in particular due to the charging of capacitors in the peripheral unit. This would consequently result in an immediate voltage drop if power is supplied by means of the mobile operating device.

SUMMARY

The teachings of the present disclosure describe an actuator with a more reliable serial interface. The actuator comprises a power supply connection for connecting the actuator to an external power supply. It also comprises a control unit for controlling and monitoring the actuator, and also a peripheral unit with in particular heavy power consumers. Furthermore, the actuator has a connection socket, which is connected to a serial interface of the control unit in particular in regards to signals and data. The control unit is set up to receive primary configuration data from an operating device connected to the connection socket. In some embodiments, the control unit is set up to send secondary configuration data and/or diagnostic data to the operating device.

In some embodiments, an actuator for a Heating, Ventilation, and Air Conditioning (HVAC) installation, has a power supply connection (6) for connecting the actuator to an external power supply (4), a control unit (10) for controlling and monitoring the actuator, a peripheral unit (20) with in particular heavy power consumers (21, 22, 23), and also a connection socket (7) which is connected to a serial interface (12) of the control unit (10), wherein the control unit (10) is set up to receive primary configuration data (RXD) from an operating device (2) connected to the connection socket (7) and/or is set up to send secondary configuration data (TXD) and/or diagnostic data (DIAG) to the operating device (2), characterized in that the connection socket (7) and the power supply connection (6) are interconnected such that a respective current fed in externally feeds exclusively in to a common connection (GA), a voltage regulator (63) for supplying power to the control unit (10) and also a switching means (61), which can be activated by said control unit, for supplying power to the peripheral unit (20) are connected downstream of the common connection (GA), and the control unit (10) is set up to activate the switching means (61) to close only if a first voltage value (V1) detected by the control unit (10) at a feed-in point (AS) of the power supply connection (6) exceeds a first comparison value (U1) or if a second voltage value (V2) detected by the control unit (10) at the common connection (GA) exceeds a second comparison value (U2).

In some embodiments, the first or second comparison value (U1, U2) is defined such that the first or second voltage value (V1, V2) definitely exceeds the respective comparison value (U1, U2) after the external power supply (4) is switched on.

In some embodiments, the control unit (10) is set up to receive the primary configuration data (RXD) and/or send the secondary configuration data (TXD) and/or diagnostic data (DIAG) only if the first or second voltage value (V1, V2) falls below the respective comparison value (U1, U2).

In some embodiments, the control unit (10) is set up to store the primary configuration data (RXD) in a nonvolatile memory (13) and/or, on the basis of said data, to update an operating program (PRG) of the control unit (10).

In some embodiments, the maximum total electrical output of the peripheral unit (20) is greater by at least a factor of 2, in particular by at least a factor of 5, than the maximum electrical output of the electronic components (10-15, 62, 63) of the actuator that are required for data transmission.

In some embodiments, the peripheral unit (20) additionally comprises the communications interface (23).

In some embodiments, the control unit (10) has a microcontroller (11), at least one A/D converter (14, 15), the serial interface (12), and also a nonvolatile memory (13) for storing the configuration data (RXD, TXD) and/or diagnostic data (DIAL).

In some embodiments, at least one of the electronic components (12-15) is integrated into the microcontroller (11).

In some embodiments, at least one of the electronic components (12-15) receives its electrical feed at least indirectly from the voltage regulator (63).

In some embodiments, the serial interface (12) is a USB interface, an IEEE 1394 interface, or a Lightning interface, and wherein the connection socket (7) is a USB connection socket, an IEEE 1394 connection socket, or a Lightning connection socket.

BRIEF DESCRIPTION OF THE DRAWING

The single FIGURE shows the wiring diagram of an exemplary actuator 1 incorporating teachings of the present disclosure.

DETAILED DESCRIPTION

In some embodiments, the connection socket and the power supply connection are interconnected such that a respective electric current fed in externally feeds into a common connection. In particular a respective electric current fed in externally feeds exclusively into a common connection. "Exclusively" means here that the electric current fed in via the power supply connection cannot feed into the connection socket of the serial interface back into the connected operating device. In the reverse case this means that the electric current fed in via the connection socket of the serial interface cannot feed via the power supply connection back into the external power supply. This prevents possible damage, primarily to the operating device, due to overvoltage.

In some embodiments, a voltage regulator for supplying power to the control unit is connected downstream of the common connection. In some embodiments, a controllable switching means, which can be activated by the control unit to open and close, is connected downstream of the common connection. In the closed state of the switching means the voltage applying at the common connection can then be switched through as a power supply to the peripheral unit. The control unit is furthermore set up to activate the switching means to close only if a first voltage value detected by the control unit at a feed-in point of the power supply connection exceeds a first comparison value or if a second voltage value detected by the control unit at the common connection exceeds a second comparison value.

It is entirely sufficient for data transmission between the operating device and the actuator if only those electronic components of the actuator that are required for the data transmission are operating or supplied with electric current respectively. These components are typically the control unit of the actuator, the voltage regulator at least for the control unit, preferably a decoupling diode to prevent a rearward feed in to the connected operating device, a nonvolatile memory (flash memory, EEPROM), the serial interface, and also an electronic means for detecting the first or second voltage value and also for comparing with the first or second comparison value. The electronic means can be a voltage comparator for example. The voltage regulator is preferably a linear voltage regulator or alternatively a dc/dc converter.

In other words, the entire heavy-duty peripheral unit remains current-free. This is achieved by means of a controllable switching means which interrupts the current supply from the power supply connection. The switching means is a switching transistor or a relay for example. This reduces the power consumption of the actuator via the serial connection socket to a range of 10 mW to 100 mW for example. A relatively small electrical output of this type can be provided without difficulty by a serial interface of the operating device. In some embodiments, the serial interface is a USB interface and the actuator-side connection socket a USB connection socket.

The USB connection socket may be arranged on the casing of the actuator. In particular the USB connection socket ends at least virtually flush with the outer side of the actuator casing. The USB connection socket can be a type A USB socket, a type B USB mini-socket, a type B USB micro-socket, or a type C USB micro-socket for example.

The USB interface is in widespread use as a standardized interface. Additionally, the great majority of the handheld devices deserving consideration as mobile operating devices such as tablet computers and smart phones already possess such a USB interface with a corresponding USB connection socket. Due to the comparatively small electrical output to be provided for an inventive actuator even modern tablet computers and smart phones are capable, for example in the special OTG mode (for "On The Go"), of making a sufficient electric current or a sufficient electrical output respectively available for data transmission.

In some embodiments, the serial interface can be an IEEE 1394 interface or a Lightning interface, and the connection socket an IEEE 1394 connection socket or a Lightning connection socket. Interfaces and connection sockets of this type are used primarily in handheld devices produced by Apple Inc.

In some embodiments, the first or second comparison value is defined such that the first or second voltage value definitely, i.e. reliably, exceeds the respective comparison value after the external power supply is switched on. This further increases the reliability of the interface. In the simplest case the serial interface of the actuator, particularly the USB interface, is set up or configured respectively for the feed-in of a maximum electrical dc voltage of 5 V to 9 V. This dc voltage is then also present at the common connection, where relevant reduced by a forward voltage in the case of a decoupling diode being present. On the other hand, the supply dc voltage provided via the external power supply at the feed-in point of the power supply connection typically lies in the range 20 V to 36 V. This is the case if the actuator is switched on, is connected to the external power supply, or if the external power supply is switched on. A typical value is 24 V.

In some embodiments, a first voltage value applying at the feed-in point of the power supply connection is detected and the said value compared with a first comparison value. The switching means is activated to close only if the first voltage value at the feed-in point increases from 0 V to the 24 V of the external power supply and therefore definitely exceeds the first comparison value. The first comparison value can be defined at a voltage value of 12 V for example. For safety reasons however the first comparison value should have a voltage value which lies at least 1 V above the nominal USB dc voltage being fed in, such as 6 V for example.

In some embodiments, a second voltage value can be detected at the common connection in place of the first voltage value, and the said value compared with a second comparison value. The second comparison value is dimensioned such that it preferably lies in the center between the nominal USB dc voltage and the nominal supply dc voltage of the external power supply. In the present case the second comparison value then has a voltage value of (24 V−5 V)/2=9.5 V. For safety reasons, in this case also, the second comparison value should have a voltage value which lies at least 1 V above the nominal USB dc voltage being fed in.

This means that in the current-free state of the actuator only the USB dc voltage initially applies at the common connection. The voltage regulator the lowers this dc voltage, for example to a voltage value of 3.3 V as a typical operating voltage for a microcontroller. The switching means for switching the supply voltage through to the peripheral unit goes to blocking or is activated to block respectively. If the actuator is then switched on or connected to the external power supply respectively then the dc voltage applying at the common connection rises to the value of the supply voltage at 24 V. The second voltage value therefore exceeds reliably, and with a large safety voltage value, the second comparison value of 9.5 V defined at the center of the differential voltage. At this point the switching means is switched through for the purpose of switching through the supply voltage then present from the external supply voltage to the supply voltage to the peripheral unit. In some embodiments, two decoupling diodes are used to prevent a rearward feeding of the USB dc voltage and also of the supply voltage. With reference to calculating the central second comparison value the respective forward voltage of the diodes drops out.

In some embodiments, the actuator can additionally have an interference suppression filter, power filter, and/or overvoltage filter connected between the power supply connection and the feed-in point of the power supply connection. In some embodiments, the actuator can have an ac power pack connected between the power supply connection and the feed-in point of the power supply connection to convert an ac supply voltage coming from the external power supply in to a dc voltage. The ac power pack can be a 230 V/50 Hz power pack or a 100 V/60 Hz power pack for example. The power pack preferably has galvanic separation. As an alternative to the power pack the actuator can have a dc/dc converter, to convert a dc supply voltage of the external power supply into an output-side dc voltage, e.g. in a potential-free manner. The dc/dc converter can be set up for example to convert a dc supply voltage of 400 V into a respectively floating output-side dc voltage of 24 V.

In some embodiments, the control unit is set up to receive the primary configuration data and/or send the secondary configuration data and/or diagnostic data only if the first or second voltage value falls below the respective comparison value. This may be advantageous for example if external access to the actuator via the serial interface during ongoing operation the actuator is to be prevented for safety reasons.

In some embodiments, the control unit is set up to store the primary configuration data in a nonvolatile memory and/or, on the basis of said data, update an operating program of the control unit, i.e. the microcontroller. The memory is preferably a flash memory which retains its memory contents even when the memory is in the current-free state. Part of the configuration data can comprise at least one part of an updated operating program in terms of firmware, which is then loaded into the flash memory of a microcontroller and is executed following a (power-up) reset of the microcontroller.

In some embodiments, the maximum total output of the peripheral unit is greater by a factor of at least 2, in particular by a factor of at least 5, than the maximum electrical output of the electronic components of the actuator that are required for data transmission. The electronic components are typically the control unit of the actuator, the voltage regulator at least for the control unit, the decoupling diode, the nonvolatile memory (EEPROM, flash memory), and the serial interface. In some embodiments, the peripheral unit additionally comprises the communications interface. This enables data communications between the actuator and a higher-level control device of the HVAC installation.

In some embodiments, the control unit has a microcontroller, at least one A/D converter, the serial interface, and also a nonvolatile electronic memory (EEPROM) at least for storing the configuration data and/or diagnostic data. In some embodiments, at least one of the electronic components, i.e. the at least one A/D converter, the serial interface, and also the nonvolatile electronic memory (EEPROM), is already integrated into the microcontroller.

In some embodiments, at least one of the electronic components of the control unit, i.e. the microcontroller, the at least one A/D converter, the serial interface, and the nonvolatile electronic memory (EEPROM), or the microcontroller with the electronic components already integrated respectively, can receive its electrical feed at least indirectly, i.e. directly or via a further component, from the voltage regulator.

The single FIGURE shows the wiring diagram of an exemplary actuator 1 incorporating teachings of the present disclosure. In the left part of the FIGURE the actuator 1 has a peripheral unit 20, which has a motor control unit 21 or "motor control system" respectively, and an electric motor 22, which receives its electrical feed by means of the motor control unit 21. The motor control unit 21 typically has a voltage converter. Furthermore, the peripheral unit 20 has a communications interface 23 or network adapter respectively for connecting to a communications bus 5. The communications interface 23 is provided in this regard for communicating with a higher-level control facility of the HVAC installation HVAC. AD designates the drive data that is exchanged between the illustrated actuator 1 and the higher-level control facility (not shown here). The drive data AD is output by a control unit 10 of the actuator 1 via this communications interface 23 and received by same, and forms part of the actuator data DP that is exchanged between the control unit 10 and the peripheral unit 20. The actuator data DP can comprise further data such as for example diagnostic data from the motor control unit 21, motor temperature values or signaling, if an end stop of the actuator is reached.

In the upper right part of the box representing the actuator 1 are shown a power supply connection 6 for connecting the actuator 1 to an external power supply 4 and also a USB connection socket 7 as an example of a serial connection socket. A tablet computer 2 is connected to the USB connection socket 7 via a USB cable 3, by way of example, as an operating device for possible data transmission. This approach means it is also possible in principle to draw an electric current from the battery of the tablet computer 2, to supply a device connected to the USB connection socket of the tablet computer 2 with current. The key factor for the said operating mode is that the USB controller of the tablet computer, or the operating device 2 in general respectively, is set up, in compliance with the USB OTG specification (OTG for "On-The-Go"), to act as host i.e. as bus master, and to provide an electrical output to supply the connected device, such as the actuator 1 in this case. Correspondingly the USB controller in the actuator 1 is set up to act at least as slave, i.e. also as USB host. In this regard the USB controller 12 has an electrical connection to the actuator-side USB connection socket 7 via two data lines 71, designated by D+ and D−, for the purpose of data transmission with the connected operating device 2

RXD designates primary configuration data which can be loaded by the actuator 1 from the tablet computer 2. TXD designates secondary configuration data and DIAG designates diagnostic data which can be loaded by the tablet computer 2 from the actuator 1. In this respect "APP" designates an application on the tablet computer 2 which is programmed to carry out transmission of the configuration data TXD, RXD, and also of the diagnostic data DIAG, between the tablet computer 2 and the connected actuator 1 by means of corresponding user-side inputs on the tablet computer 2.

In some embodiments, the connection socket 7 and the power supply connection 6 are then interconnected such that a respective electric current fed in externally feeds exclusively into a common connection GA. This is achieved by means of two decoupling diodes 62, 63. In some embodiments, two switching transistors, which are activated to close in the presence of a positive voltage in the diode forward direction, can also be used. In this regard AS designates the feed-in point for the power supply connection 6 and US the feed-in point for the connection socket 7. V1 and V2 designate a first and a second voltage value which apply with reference to a common reference potential (ground) at the feed-in point AS of the power supply connection 6, or the common connection GA respectively, and are detected in each case by an A/D converter 14, 15 of the control unit 10. A voltage regulator 63 is connected downstream of the common connection GA for a power supply PS to the control unit 10.

In the present example, the control unit 10 comprises a microcontroller 11, in which the two A/D-converters 14, 15 and also a USB interface 12 or a USB controller are already integrated. A nonvolatile memory 13, typically an EEPROM memory, is usually also already integrated. This is shown separately in terms of the FIGURE for reasons of clarity. The nonvolatile memory 13 is provided in order to store the overall operating program PRG for controlling and monitoring the actuator 1, and also the configuration data to set up the actuator 1 for the envisioned application. Diagnostic data DIAG can also be stored in the memory 13 in a nonvolatile manner, in the sense of an error memory. In some embodiments, a controllable switching means 61, for supplying power to the peripheral unit 20, is connected downstream of the common connection GA.

In the present example, activation is effected by a digital output on the microcontroller 11 of the control unit 10. Based on the operating program PRG on the microcontroller 11 the microcontroller 11 is accordingly programmed or set up respectively to activate the switching means 61 to close only if a first voltage value V1 detected at the feed-in point AS of the power supply connection 6 exceeds a first comparison value U1. In some embodiments, the microcontroller 11 can be programmed on the basis of the operating program PRG to activate the switching means 61 to close only if a second voltage value V2 detected by the microcontroller 11 at the common connection GA exceeds a second comparison value U2. The two voltage values V1, V2 are already present as digital values in the microcontroller 11 following the analog/digital conversion. The two comparison values V1, V2 preferably form part of the configuration data and are stored in the memory 13.

Therefore, even in the current-free state of the actuator 1—symbolized by a cut or scissor symbol in the external power supply 4 at the input of the power supply connection 6—it is possible to have an electrical supply to the components 10-15, 63, 63, which are required for transmission of the configuration data RXD, RXD and also the diagnostic data DIAG, without the entire power supply collapsing due to the power section 20 being switched off.

LIST OF REFERENCE SYMBOLS

1 Actuator
2 Operating device, mobile operating device, tablet, smart phone
3 Connecting line, cable, USB cable, Firewire cable
4 Power supply line, power line
5 Network, communications bus
6 Power supply connection, ac power pack
7 Connection socket, USB socket, Firewire socket
10 Control unit, electronic control unit
11 Microcontroller
12 Serial interface, USB interface, Firewire interface
13 Electronic, nonvolatile memory, EEPROM
14, 15 Analog/digital converter
20 Peripheral unit, power section
21 Motor control unit, motor control system
22 Motor, servomotor, electromotor
23 Communications interface, network adapter
61 Switching element, semiconductor switch, FET
62 Switching element, diode, decoupling diode, FET
63 Voltage regulator 71 Data lines
AD Drive data, actuator data
APP Application, App
AS, US Feed-in point
DIAG Diagnostic data
DP Actuator data
HVAC HVAC installation
PP Power supply for peripheral unit
PRG Operating program, program, computer program
PS Power supply for electronic control unit
RXD Primary configuration data (intended to be received)
TXD Secondary configuration data (actuator-side)
U1, U2 Comparison values, voltage comparison values
US Second feed-in point
V1, V2 Voltage values

What is claimed is:

1. An actuator for a Heating, Ventilation, and Air Conditioning (HVAC) installation, the actuator comprising:
   a power supply connection for connecting the actuator to an external power supply;
   a processor for controlling and monitoring the actuator;
   a peripheral unit including an electric motor and a motor control unit for the electric motor;
   a connection socket connected to a serial interface of the processor;
   wherein the processor is programmed to receive primary configuration data from an operating device connected to the connection socket and/or to send secondary configuration data and/or diagnostic data to the operating device;
   at least one diode between the connection socket and the power supply connection forcing a respective current fed in externally to feed exclusively into a common connection;
   a voltage regulator for supplying power to the processor connected downstream of the common connection; and
   a switch configured to be activated by the processor for supplying power to the peripheral unit connected downstream of the common connection; and
   wherein the processor is programmed to activate the switch to close only if a first voltage value detected by the processor at a feed-in point of the power supply connection exceeds a first limit of at least 6 volts or if a second voltage value detected by the processor at the common connection exceeds a second limit of at least 9.5 volts.

2. The actuator as claimed in claim 1, wherein the first limit or the second limit is defined such that the first or second voltage value definitely exceeds the respective limit after the external power supply is switched on.

3. The actuator as claimed in claim 2, wherein the processor is programmed to receive the primary configuration data and/or send the secondary configuration data and/or diagnostic data only if the first voltage value or the second voltage value falls below the respective limit.

4. The actuator as claimed in claim 1, wherein the processor stores primary configuration data in an associated nonvolatile memory and/or, on the basis of said data, updates an operating program of the processor.

5. The actuator as claimed in claim 1, wherein a maximum total electrical output of the peripheral unit is greater by at least a factor of 2 than a maximum electrical output of electronic components of the actuator required for data transmission.

6. The actuator as claimed in claim 1, wherein the processor includes: a microcontroller, an A/D converter, the serial interface, and a nonvolatile memory for storing the configuration data and/or diagnostic data.

7. The actuator as claimed in claim 6, wherein at least one of the A/D converter, the serial interface, and the nonvolatile memory is integrated into the microcontroller.

8. The actuator as claimed in claim 6, wherein at least one of the A/D converter, the serial interface, and the nonvolatile memory receives an electrical feed at least indirectly from the voltage regulator.

9. The actuator as claimed in claim 1, wherein:
   the serial interface comprises at least one interface selected from the group consisting of: a USB interface, an IEEE 1394 interface, and a Lightning interface; and
   the connection socket comprises a socket selected from the group consisting of: a USB connection socket, an IEEE 1394 connection socket, and a Lightning connection socket.

* * * * *